United States Patent
Xu et al.

(10) Patent No.: US 9,164,315 B2
(45) Date of Patent: Oct. 20, 2015

(54) TRANSFLECTIVE DISPLAY AND MANUFACTURING METHOD THEREOF

(75) Inventors: Zhiqiang Xu, Beijing (CN); Hui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 367 days.

(21) Appl. No.: 13/805,049

(22) PCT Filed: Jul. 19, 2012

(86) PCT No.: PCT/CN2012/078868
§ 371 (c)(1),
(2), (4) Date: Dec. 18, 2012

(87) PCT Pub. No.: WO2013/010491
PCT Pub. Date: Jan. 24, 2013

(65) Prior Publication Data
US 2013/0114028 A1    May 9, 2013

(30) Foreign Application Priority Data
Jul. 21, 2011 (CN) .......................... 2011 1 0205758

(51) Int. Cl.
*G02F 1/1335* (2006.01)
*G02F 1/1333* (2006.01)
*G02F 1/1343* (2006.01)

(52) U.S. Cl.
CPC ........ *G02F 1/133555* (2013.01); *G02F 1/1333* (2013.01); *G02F 2001/134372* (2013.01); *G02F 2001/134381* (2013.01)

(58) Field of Classification Search
USPC ........................................................ 349/114
See application file for complete search history.

(56) References Cited

U.S. PATENT DOCUMENTS

| 2004/0090576 A1 | 5/2004 | Chuang |
| 2006/0023146 A1* | 2/2006 | Yang et al. ................... 349/114 |
| 2009/0059134 A1 | 3/2009 | Ishikawa et al. |

FOREIGN PATENT DOCUMENTS

| CN | 1979283 A | 6/2007 |
| CN | 201021963 Y | 2/2008 |
| CN | 101393335 A | 3/2009 |
| CN | 101846840 A | 9/2010 |
| KR | 1020050114862 A | 12/2005 |
| WO | 2009/128371 A1 | 10/2009 |

OTHER PUBLICATIONS

First Chinese Office Action dated Mar. 4, 2014; Appln. No. 201110205758.5.
International Preliminary Report on Patentabiliy dated Jan. 21, 2014; PCT/CN2012/078868.
International Search Report; mailed Apr. 10, 2012; PCT/CN2012/078868.

* cited by examiner

*Primary Examiner* — Lucy Chien
(74) *Attorney, Agent, or Firm* — Ladas & Parry LLP

(57) ABSTRACT

Embodiments of the invention provide a transflective liquid crystal display and a method for manufacturing the same. The transflective liquid crystal display comprises: an array substrate; a color filter substrate; a liquid crystal layer interposed between the array substrate and the color filter substrate; a plurality of pixels formed on the array substrate, wherein each pixel comprises a transmissive region and a reflective region, and the liquid crystal layer has the same thickness at the transmissive region and the reflective region; a first transparent electrode formed on the array substrate; a second transparent electrode formed on the color filter substrate at the transmissive region, wherein an initial optical delay of the liquid crystal layer at the transmissive region is different from that of the liquid crystal layer at the reflective region.

19 Claims, 3 Drawing Sheets

TRANSFLECTIVE DISPLAY AND MANUFACTURING METHOD THEREOF

BACKGROUND

Embodiments of the invention relate to a transflective liquid crystal display and a method for manufacturing the same.

A liquid crystal display may comprise components such as a display screen, a backlight and a driving circuit and so on. The display screen may comprise an array substrate and a color filter substrate bonded to each other and a liquid crystal layer filled in a gap between the array substrate and the color filter substrate. A principle for displaying an image by the liquid crystal display is based on the following characteristic: a liquid crystal molecule in the liquid crystal layer rotates by different angles according to a level of a voltage applied by the driving circuit, and the alignment direction of the liquid crystal molecule also varies, which causes variation on the amount of irradiation light transmitted through the liquid crystal molecule. When the backlight at a back side or a lateral side of the array substrate irradiates light to the display screen, the irradiation light transmits through the display screen and irradiates to eyes of a viewer, and thereby the viewer may see images displayed on the display screen.

In order to reduce energy consumption of the backlight, a transflective liquid crystal display structure is developed from the liquid crystal display, each pixel in a display screen of this transflective liquid crystal display is divided into two regions: one is a transmissive region, in which irradiation light from the backlight may be transmitted through the display screen, the other is a reflective region, in which light irradiated from the outside to the display screen is reflected to the liquid crystal and then to the viewer by a diffuse reflection plate. Since the external light may be used alone or with the backlight, the transflective liquid crystal display can reduce the energy consumption of the backlight.

Since light emitted outward from the transmissive region is generated by the backlight and light emitted outward from the reflective region is generated by reflecting light incident into the display screen from the outside, there are a certain optical delay between the light emitted outward from these two regions.

In order to eliminate such an optical delay between the light emitted outward from the transmissive region and the reflective region, in the prior art, the liquid crystal layer is usually designed to have different thicknesses in the transmissive region and the reflective region, or a compensation film is added so as to eliminate the optical delay between the light emitted outward from the transmissive region and the reflective region.

However, the technical solution of the aforesaid prior art is difficult to be implemented, which increases the difficulty for manufacturing the transflective liquid crystal display and increases the production cost of the transflective liquid crystal display.

SUMMARY

One objection of the invention is to provide a transflective liquid crystal display and a method for manufacturing the same, which can reduce the difficulty in manufacturing process and the production cost of the transflective liquid crystal display.

In order to solve the aforesaid technical problems, the invention provides the following technical solutions.

An embodiment of the invention provides a transflective liquid crystal display comprising: an array substrate; a color filter substrate bonded to the array substrate; a liquid crystal layer interposed between the array substrate and the color filter substrate and comprising a liquid crystal molecule; a plurality of pixels formed on the array substrate, wherein each pixel comprises a transmissive region and a reflective region adjacent to each other, and the liquid crystal layer has the same thickness at the transmissive region and the reflective region; a first transparent electrode formed on the array substrate; a second transparent electrode formed on the color filter substrate at the transmissive region, wherein the liquid crystal layer at the transmissive region further comprises a cured photosensitive monomer, and at the reflective region further comprises an uncured photosensitive monomer, an initial optical delay of the liquid crystal layer at the transmissive region is different from that of the liquid crystal layer at the reflective region so that light emitted from the reflective region has a phase equal to that of light emitted from the transmissive region when the transflective liquid crystal display normally displays, and the first transparent electrode and the second transparent electrode are used to set the initial optical delay of the liquid crystal layer at the transmissive region.

An embodiment of the invention further provides a method for manufacturing a transflective liquid crystal display comprising: forming an array substrate on which a first transparent electrode is formed; forming a color filter substrate, wherein each pixel of the transflective liquid crystal display is divided to a transmissive region and a reflective region, and a second transparent electrode is formed on the color filter substrate at the transmissive region; interposing a liquid crystal layer between the array substrate and the color filter substrate, and doping a photosensitive monomer into the liquid crystal layer and performing a bonding process, so that the liquid crystal layer at the transmissive region and the reflective region has a first optical delay; applying a first voltage to the first transparent electrode, and applying a second voltage having a voltage difference from the first voltage to the second transparent electrode, wherein the voltage difference causes the optical delay of the liquid crystal layer at the transmissive region to be changed from the first optical delay to a second optical delay; and irradiating the liquid crystal layer by using ultraviolet irradiating light to cure the photosensitive monomer in the liquid crystal layer at the transmissive region, so that the optical delay at the transmissive region is fixed at the second optical delay, wherein the first optical delay is different from the second optical delay so that light emitted from the reflective region has a phase equal to that of light emitted from the transmissive region when the transflective liquid crystal display normally displays.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
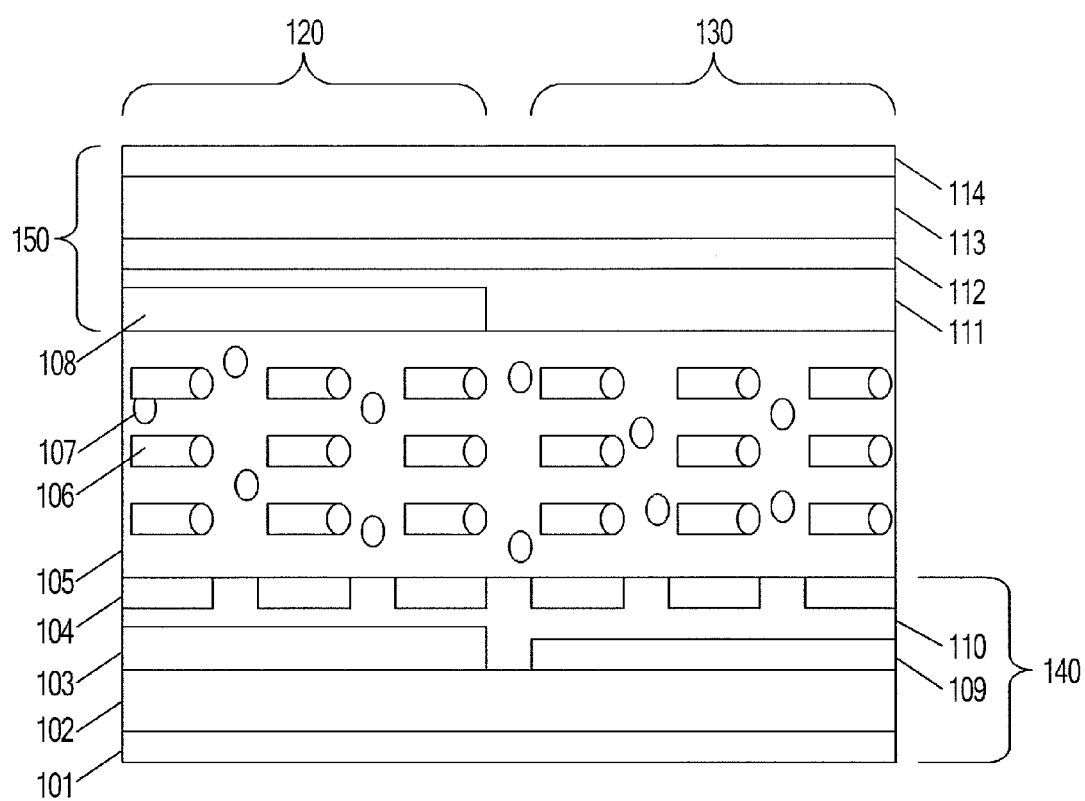
FIG. 1 is a schematic structural view of a transflective liquid crystal display provided by an embodiment of the invention.

An embodiment of the invention provides a transflective liquid crystal display, which may specifically comprise a plurality of pixels, as shown in FIG. 1, each pixel may be divided into two adjacent regions, i.e., a transmissive region 120 and a reflective region 130, and each pixel may comprise:

a polarizer 101;

a substrate 102, which may be referred to an array substrate;

a transparent electrode 103 disposed at the transmissive region on the substrate 102, which may be a common electrode or a pixel electrode;

a reflecting electrode 109 formed at the reflective region on the substrate 102 and disposed to be separated and insulated from the transparent electrode 103, the reflecting electrode 109 having a function of reflecting external light, blocking irradiation light such as ultraviolet ray and so on;

a transparent electrode 104 formed above the transparent electrode 103, which may be a pixel electrode or a common electrode and can comprise a plurality of strip transparent electrode blocks spaced apart from each other by a predetermined distance set as required or according to a characteristic of the liquid crystal molecule.

an insulation layer 110 filling a space between the transparent electrode 103, the transparent electrode 104 and the reflective electrode 109;

a liquid crystal layer 105, comprising a liquid crystal molecule 106 and a photosensitive monomer 107, interposed between the substrate 102 on which the aforesaid components are formed and a substrate 113 on which the components to be described hereinafter are formed;

a transparent electrode 108 formed at the transmissive region on the substrate 113;

an insulation layer 111 filling a space between the transparent electrode 108, the liquid crystal layer 105 and a color filter 112;

the color filter 112;

the substrate 113 which may be referred to a color filter substrate;

a polarizer 114 with an angle of 90° (degree) between the polarization direction of the polarizer 114 and the polarization direction of the polarizer 101.

In an embodiment of the invention, as shown in FIG. 1, the polarizer 101, the substrate 102, the transparent electrode 103, the transparent electrode 104, the reflective electrode 109, the insulation layer 110 below the liquid crystal layer 105 may be collectively referred to an array substrate 140, i.e., a TFT substrate 140, and the transparent electrode 108, the insulation layer 111, the color filter 112, the substrate 113 and the polarizer 114 above the liquid crystal layer 105 may be collectively referred as a color filter substrate 150.

In an embodiment of the invention, the liquid crystal molecule 106 and the photosensitive monomer 107 in the liquid crystal layer 105 at the transmissive region 120 are processed to make the liquid crystal layer 105 at the transmissive region 120 have an initial optical delay of ½ wavelength (λ) during operation, and the liquid crystal layer 105 at the reflective region 130 still maintain an initially set optical delay of 3λ/4 during operation due to the presence of the reflective electrode 109, so that the optical delay between the light emitted from the transmissive region 120 and the light emitted from the reflective region 130 may be eliminated.

Here, the photosensitive monomer 107 may be methyl methacrylate, acroleic acid or the like, for example.

An example of a method for manufacturing a transflective liquid crystal display provided by an embodiment of the invention will be described in detail hereinafter.

Firstly, a TFT substrate 140 and a color filter substrate 150 may be formed.

In particular, the TFT substrate 140 and the color filter substrate 150 may be formed by assembling various electrodes, insulation layers, color filters and so on involved in the transflective liquid crystal display provided by the embodiment of the invention according to the structural relationship as shown in FIG. 1 (the polarizer may be attached after a bonding process).

Then photosensitive monomer 107 may be doped into the liquid crystal layer 105 and a bonding process is performed, and an optical delay of the liquid crystal layer 105 is set to 3λ/4, wherein λ is a wavelength of light transmitted through the liquid crystal layer. At this time, a schematic view of an initial state of the liquid crystal layer 105 is shown in FIG. 1.

Figure 2:
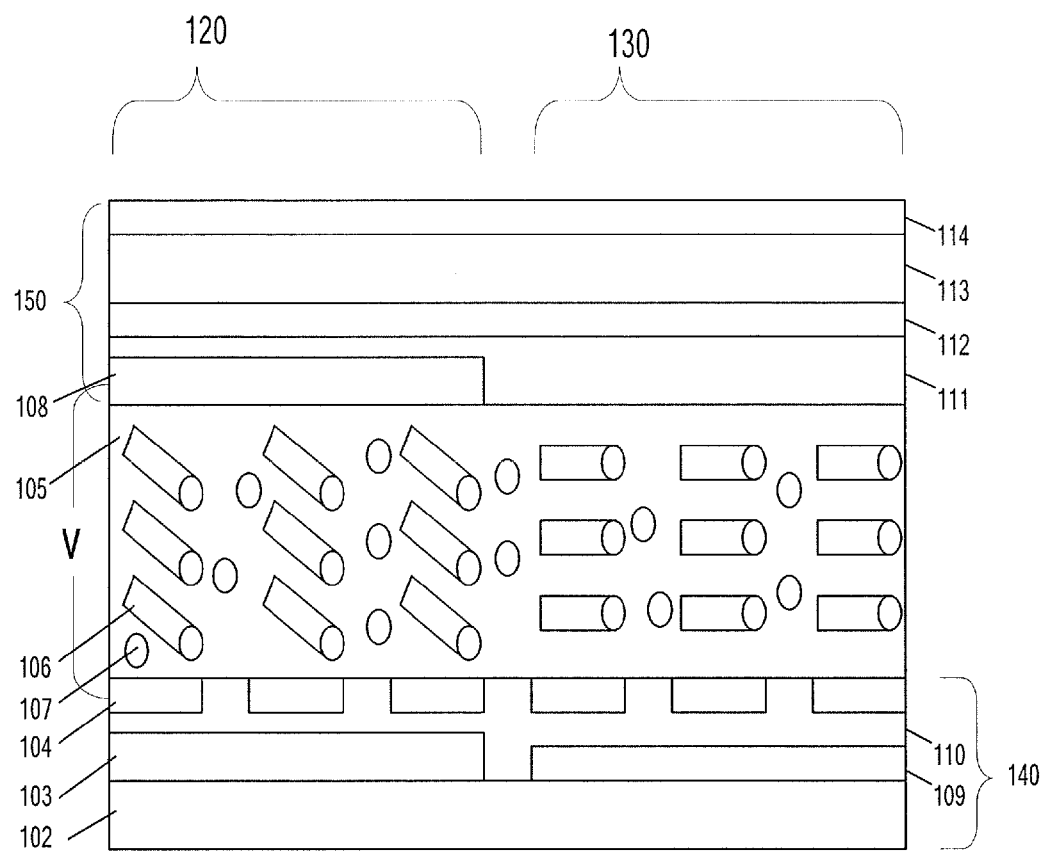
FIG. 2 is a first schematic view showing a stage for manufacturing a transflective liquid crystal display provided by an embodiment of the invention.
Figure 3:
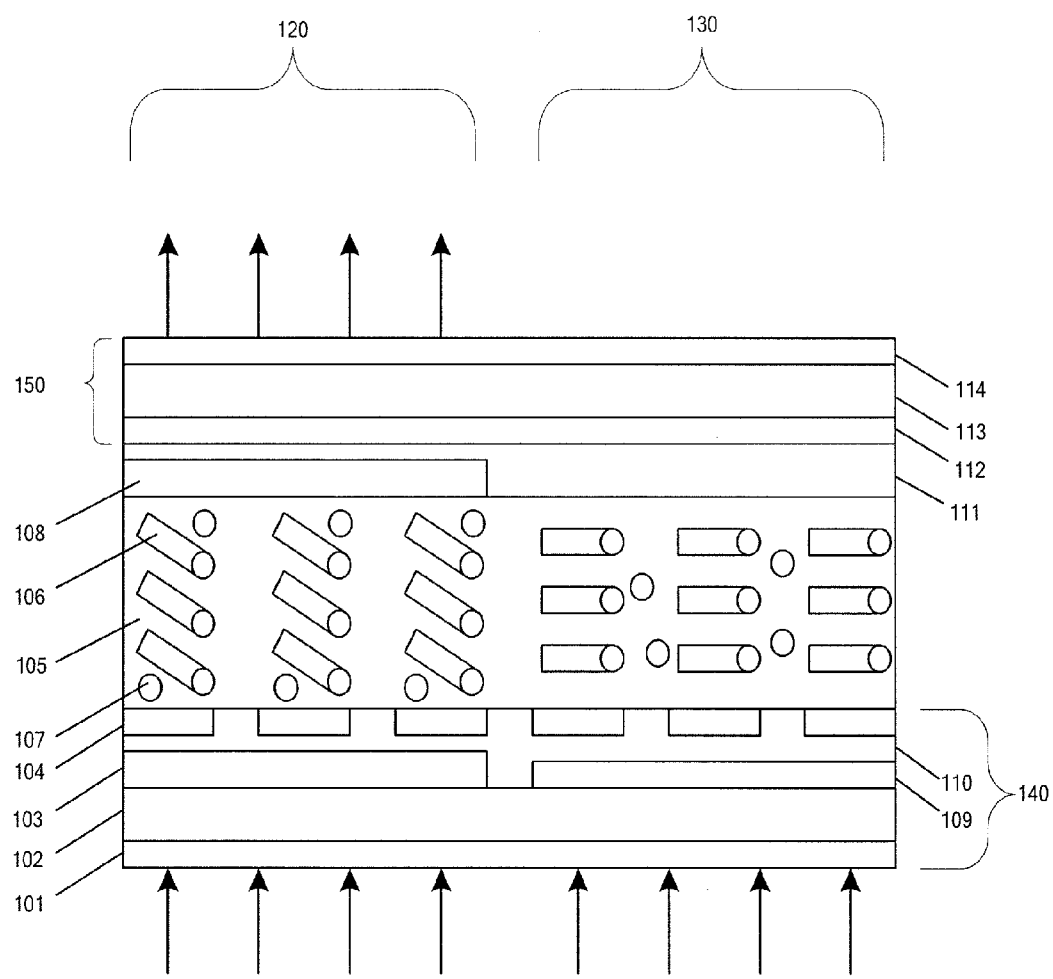
FIG. 3 is a second schematic view showing a stage for manufacturing a transflective liquid crystal display provided by an embodiment of the invention.

Next, voltages with different values are applied to the transparent electrode 104 and the transparent electrode 108 at the transmissive region 120, respectively, that is, there is a voltage difference V between the transparent electrode 104 and the transparent electrode 108, which may allow the liquid crystal molecule 106 in the liquid crystal layer 105 at the transmissive region 120 to rotate by an angle in a certain direction, the rotated liquid crystal molecule may allow the optical delay of the liquid crystal layer at the transmissive region 120 to be changed from the initially set 3λ/4 to λ/2. At this time, the liquid crystal layer 105 is shown in FIG. 2. Since different liquid crystal molecules 106 have different characteristics, the voltage difference V, rotating directions and special values of rotating angles of the liquid crystal molecule 106 are not limited in embodiments of the invention, as long as the optical delay of the liquid crystal layer at the transmissive region can be ensured as λ/2.

Finally, ultraviolet irradiating light may be used to irradiate the transmissive region 120 and the reflective region 130 of the pixel.

In particular, the ultraviolet irradiating light may be irradiated to the transmissive region 120 and the reflective region 130 of the pixel from the TFT substrate 140 side.

At the transmissive region 120, due to the irradiation of the ultraviolet irradiating light, the photosensitive monomer 107 may be cured at surfaces of the liquid crystal layer 105 adjacent to upper and lower substrates (140, 150), thereby the liquid crystal molecule 106 in the liquid crystal layer 105 at the transmissive region 120 may be fixed at the rotated angle, thus even if the voltage applied to the transparent electrode 104 and the transparent electrode 108 are removed, the initial optical delay of the liquid crystal layer 105 at the transmissive region 120 during operation may be still 212. That is, in the embodiment of the invention, the initial optical delay of the liquid crystal layer 105 at the transmissive region 120 during operation is set to λ/2 through the above configuration and processes, then when the liquid crystal display normally operates, it can operate in a normal operation mode, and the liquid crystal layer 105 at the transmissive region 120 may operate with an initial optical delay of $\lambda/2$ as its starting point by applying corresponding operation voltages to the transparent electrode 103 and the transparent electrode 104.

And at the reflective region 130, since the reflective electrode 109 which has a function of reflecting external light irradiated from the color filter substrate 150 side and blocking the ultraviolet irradiating light irradiated from the TFT substrate 140 side is disposed, the ultraviolet irradiating light may not be transmitted through the reflective electrode 109 and not irradiate into the liquid crystal layer 105 at the reflective region 130, thus the liquid crystal molecule 106 and the photosensitive monomer 107 in the liquid crystal layer 105 at the reflective region 130 may not have its states changed, thereby the initial optical delay of the liquid crystal layer 105 at the reflective region 130 during operation is still the initially set $3\lambda/4$, and then different optical delays for the reflective region 120 and the transmissive region 130 of the pixel may be achieved.

As an example, the initial optical delay of the liquid crystal layer at the transmissive region is set to $\lambda/2$, and the initial optical delay of the liquid crystal layer at the reflective region is set to $3\lambda/4$. However, those skilled in the art may be understood that the initial optical delays of the liquid crystal layer at the reflective region and the transmissive region may be set to $2n\cdot\lambda/2$ and $2n3\lambda/4$ (here n is a positive integer), respectively, or the initial optical delays of the liquid crystal layer at the reflective region and the transmissive region may be set to an integral multiple of the wavelength, respectively, as long as the optical delay between the light emitted from the transmissive region 120 and the light emitted from the reflective region 130 may be eliminated during normal operation.

A principle of the transmissive region 120 and the reflective region 130 of the pixel in a transflective liquid crystal display provided by the embodiment of the invention will be simply explained hereinafter.

At the transmissive region 120, since an initial optical axis of the liquid crystal molecule 106 in the liquid crystal layer 105 at the transmissive region 120 has a direction consistent with a polarization direction of the polarizer 101, the light emitted from the backlight is changed to linearly polarized light A after passing through the polarizer 101, the linearly polarized light A then passes through the liquid crystal layer 105 and to the polarizer sheet 114 in sequence.

When no operation voltage is applied to the transparent electrode 103 and the transparent electrode 104, the direction of the optical axis of the liquid crystal molecule 106 in the liquid crystal layer 105 at the transmissive region 120 is not changed. Since the optical axis of the liquid crystal molecule 106 has a direction consistent with the polarization direction of the linearly polarized light A, and thus the polarization direction of the linearly polarized light A is not changed after the linearly polarized light A passes through the liquid crystal layer 105, and the linearly polarized light A is blocked by the polarizer 114; at this time, the transmissive region of the pixel is in a dark state.

When an operation voltage is applied to the transparent electrode 103 and the transparent electrode 104, the direction of the optical axis of the liquid crystal molecule 106 in the liquid crystal layer 105 at the transmissive region 120 deflects by 45°. Since the initial optical delay of the liquid crystal layer 105 during operation has been changed from the initial set $3\lambda/4$ to $\lambda/2$, the polarization direction of the linearly polarized light A rotates by 90° after the light A passes through the liquid crystal layer 105, and thus it can pass the polarizer sheet 114; at this time, the transmissive region of a pixel is in a bright state.

At the reflective region 130, the initial optical axis of the liquid crystal molecule 106 in the liquid crystal layer 105 at the reflective region 130 has a direction with an angle of 45° with respect to the polarization direction of the polarizer 114. External light is changed to linearly polarized light B after passing through the polarizer 114, and is reflected by the reflective electrode 109 after passing through the liquid crystal layer 105, and then passing through the liquid crystal layer 105 again and to the polarizer 114.

When no operation voltage is applied to the transparent electrode 104 and the reflective electrode 109, the linearly polarized light B is changed to left-handed (right-handed) circularly polarized light C after passing through the liquid crystal layer 105 at the reflective region 130 (the initial optical delay is $3\lambda/4$), and changed to right-handed (left-handed) circularly polarized light D after reflected by the reflective electrode 109, and forms into linearly polarized light E having an angle of 90° with respect to the linearly polarized light B after passing through the liquid crystal layer 105 again. The linearly polarized light E cannot pass through the polarizer 114 and the reflecting region of the pixel is in a dark state.

When an operation voltage is applied to the transparent electrode 104 and the reflective electrode 109, the optical axis of the liquid crystal molecule 106 in the liquid crystal layer 105 at the reflective region 130 has a direction consistent with the direction of the polarizer 114 (or the optical delay of the liquid crystal layer 105 is 0 or $\lambda/2$), and the linearly polarized light B may pass through the polarizer sheet 114 after it passes through the liquid crystal layer 105 and is reflected by the reflective electrode 109; at this time, the reflective region of a pixel is in a bright state.

It can be seen from the above description that in the transflective liquid crystal display provided by the embodiments of the invention, the liquid crystal layer has the same thickness at the transmissive region and the reflective region of liquid crystal display. Transparent electrodes are disposed at both sides of the liquid crystal layer at the transmissive region, and a certain voltage difference exists between the two transparent electrodes. This voltage difference can cause the optical delay of the liquid crystal layer at the transmissive region to be changed from the initially set $3\lambda/4$ to $\lambda/2$. Also, the photosensitive monomer in the liquid crystal layer at the transmissive region is cured by irradiating ultraviolet irradiating light and the initial optical delay of the liquid crystal layer at the transmissive region during operation may be fixed at $\lambda/2$. However, since a reflective electrode is disposed at the reflective region of the pixel, the initial optical delay of the liquid crystal layer at the reflective region during operation may keep at the initially set $3\lambda/4$, thereby the transmissive region and the reflective region of the pixel may have different optical delays, which in turn may eliminate the optical delay between the light emitted from the transmissive region and the light emitted from the reflective region in a pixel, and the transmissive region and the reflective region in the transflective liquid crystal display provided by the embodiments of the invention employs a design in which the cell thickness in the transmissive region is the same to that in the reflecting region, therefore the manufacturing process is simple, and the difficulty in manufacturing process and the production cost for the transflective liquid crystal display are reduced.

The embodiments of the invention are thus described above. It should be noted that those skilled in the art may make any modifications and variations without departing from the spirit and scope of the invention, and all such modifications and variations are intended to be included within the protection scope of the invention.

What is claimed is:

1. A transflective liquid crystal display, comprising:
   an array substrate;
   a color filter substrate bonded to the array substrate;
   a liquid crystal layer interposed between the array substrate and the color filter substrate and comprising a liquid crystal molecule;
   a plurality of pixels formed on the array substrate, wherein each pixel comprises a transmissive region and a reflective region adjacent to each other, and the liquid crystal layer has the same thickness at the transmissive region and the reflective region;
   a first transparent electrode formed on the array substrate;
   a second transparent electrode formed on the color filter substrate at the transmissive region,
   wherein the liquid crystal layer at the transmissive region further comprises a cured photosensitive monomer, and at the reflective region further comprises an uncured photosensitive monomer, an initial optical delay of the liquid crystal layer at the transmissive region is different from that of the liquid crystal layer at the reflective region so that light emitted from the reflective region has a phase equal to that of light emitted from the transmissive region when the transflective liquid crystal display normally displays, and the first transparent electrode and the second transparent electrode are used to set the initial optical delay of the liquid crystal layer at the transmissive region,
   wherein the transmissive region of each pixel further comprises:
   a third transparent electrode disposed between the array substrate and the first transparent electrode.

2. The transflective liquid crystal display of claim 1, wherein the initial optical delay of the liquid crystal layer at the transmissive region is $\lambda/2$, and the initial optical delay of the liquid crystal layer at the reflective region is $3\lambda/4$, wherein $\lambda$ is a wavelength of light transmitted through the liquid crystal layer.

3. The transflective liquid crystal display of claim 1, wherein the first transparent electrode comprises a plurality of strip transparent electrode blocks spaced apart from each other by a predetermined distance.

4. The transflective liquid crystal display of claim 1, further comprising a reflective electrode disposed between the first transparent electrode and the array substrate at the reflective region of each pixel.

5. The transflective liquid crystal display of claim 4, wherein the reflective electrode has a function of reflecting external light irradiated from the color filter substrate side and blocking ultraviolet irradiating light irradiated from the array substrate side.

6. The transflective liquid crystal display of claim 1, wherein each pixel further comprises:
   a first insulation layer disposed between the second transparent electrode and the color filter substrate and between the liquid crystal layer and the color filter substrate.

7. The transflective liquid crystal display of claim 1, wherein each pixel further comprises: a second insulating layer disposed between the third transparent electrode and the first transparent electrode.

8. The transflective liquid crystal display of claim 4, wherein the transmissive region of each pixel further comprises:
   a third transparent electrode disposed between the array substrate and the first transparent electrode.

9. The transflective liquid crystal display of claim 8, wherein each pixel further comprises:
   a second insulating layer disposed between the third transparent electrode and the first transparent electrode and between the reflective electrode and the first transparent electrode.

10. The transflective liquid crystal display of claim 1, wherein
    the initial optical delay of the liquid crystal layer at the transmissive region and the initial optical delay of the liquid crystal layer at the reflective region are an integral multiple of a wavelength.

11. The transflective liquid crystal display of claim 1, wherein
    the initial optical delay of the liquid crystal layer at the transmissive region is $2n\cdot\lambda/2$, and the initial optical delay of the liquid crystal layer at the reflective region is $2n\cdot3\lambda/4$, wherein $\lambda$ is a wavelength of light transmitted through the liquid crystal layer, and n is a positive integer.

12. The transflective liquid crystal display of claim 1, wherein the second transparent electrode is further disposed on the color filter substrate at the reflective region, and a reflection layer is further disposed between the first transparent electrode and the array substrate at the reflective region.

13. A method for manufacturing a transflective liquid crystal display comprising:
    forming an array substrate on which a first transparent electrode is formed;
    forming a color filter substrate, wherein each pixel of the transflective liquid crystal display is divided to a transmissive region and a reflective region, and a second transparent electrode is formed on the color filter substrate at the transmissive region;
    interposing a liquid crystal layer between the array substrate and the color filter substrate, and doping a photosensitive monomer into the liquid crystal layer and performing a bonding process, so that the liquid crystal layer at the transmissive region and the reflective region has a first optical delay;
    applying a first voltage to the first transparent electrode, and applying a second voltage having a voltage difference from the first voltage to the second transparent electrode, wherein the voltage difference causes the optical delay of the liquid crystal layer at the transmissive region to be changed from the first optical delay to a second optical delay; and
    irradiating the liquid crystal layer by using ultraviolet irradiating light to cure the photosensitive monomer in the liquid crystal layer at the transmissive region, so that the optical delay at the transmissive region is fixed at the second optical delay,
    wherein the first optical delay is different from the second optical delay so that light emitted from the reflective region has a phase equal to that of light emitted from the transmissive region when the transflective liquid crystal display normally displays,
    wherein the method further comprises disposing a third transparent electrode between the array substrate and the first transparent electrode.

14. The method for manufacturing the transflective liquid crystal display of claim 13, further comprising:
    disposing a reflective electrode between the first transparent electrode and the array substrate.

15. The method for manufacturing the transflective liquid crystal display of claim 13, further comprising: disposing a first insulation layer between the second transparent electrode and the color filter substrate and between the liquid crystal layer and the color filter substrate.

16. The method for manufacturing the transflective liquid crystal display of claim 13, wherein the initial optical delay of the liquid crystal layer at the transmissive region is $\lambda/2$, and the initial optical delay of the liquid crystal layer at the reflective region is $3\lambda/4$, wherein $\lambda$ is a wavelength of light transmitted through the liquid crystal layer.

17. The method for manufacturing the transflective liquid crystal display of claim 13, wherein the initial optical delay of the liquid crystal layer at the transmissive region is $2n\cdot\lambda/2$, and the initial optical delay of the liquid crystal layer at the reflective region is $2n\cdot3\lambda/4$, wherein $\lambda$ is a wavelength of light transmitted through the liquid crystal layer, and n is a positive integer.

18. The method for manufacturing the transflective liquid crystal display of claim 13, further comprising: disposing the second transparent electrode on the color filter substrate at the reflective region, and further disposing a reflection layer between the first transparent electrode and the array substrate at the reflective region.

19. A transflective liquid crystal display, comprising:

an array substrate;

a color filter substrate bonded to the array substrate;

a liquid crystal layer interposed between the array substrate and the color filter substrate and comprising a liquid crystal molecule;

a plurality of pixels formed on the array substrate, wherein each pixel comprises a transmissive region and a reflective region adjacent to each other, and the liquid crystal layer has the same thickness at the transmissive region and the reflective region;

a first transparent electrode formed on the array substrate;

a second transparent electrode formed on the color filter substrate at the transmissive region, wherein the liquid crystal layer at the transmissive region further comprises a cured photosensitive monomer, and at the reflective region further comprises an uncured photosensitive monomer, an initial optical delay of the liquid crystal layer at the transmissive region is different from that of the liquid crystal layer at the reflective region so that light emitted from the reflective region has a phase equal to that of light emitted from the transmissive region when the transflective liquid crystal display normally displays, and the first transparent electrode and the second transparent electrode are used to set the initial optical delay of the liquid crystal layer at the transmissive region, wherein the initial optical delay of the liquid crystal layer at the transmissive region is $\lambda/2$, and the initial optical delay of the liquid crystal layer at the reflective region is $3\lambda/4$, wherein $\lambda$ is a wavelength of light transmitted through the liquid crystal layer.

* * * * *